(12) United States Patent
Miyazaki

(10) Patent No.: US 7,656,101 B2
(45) Date of Patent: Feb. 2, 2010

(54) COLD CATHODE TUBE DRIVE DEVICE

(75) Inventor: Hiroyuki Miyazaki, Tokyo (JP)

(73) Assignee: Sumida Corporation (JP)

( * ) Notice: Subject to any disclaimer, the term of this patent is extended or adjusted under 35 U.S.C. 154(b) by 443 days.

(21) Appl. No.: 11/577,437

(22) PCT Filed: Aug. 8, 2005

(86) PCT No.: PCT/JP2005/014497
§ 371 (c)(1),
(2), (4) Date: Apr. 18, 2007

(87) PCT Pub. No.: WO2006/043361
PCT Pub. Date: Apr. 27, 2006

(65) Prior Publication Data
US 2009/0045756 A1 Feb. 19, 2009

(51) Int. Cl.
*G05F 1/00* (2006.01)
(52) U.S. Cl. .................. 315/307; 315/274; 315/291; 315/224; 315/312
(58) Field of Classification Search .......... 315/247, 315/246, 224, 225, 291–326, 274–286
See application file for complete search history.

(56) References Cited

U.S. PATENT DOCUMENTS 5,952,791 A 9/1999 Watanabe et al.
6,420,839 B1 7/2002 Chiang et al.
2002/0097004 A1 7/2002 Chiang et al.
2007/0108921 A1* 5/2007 Matsushima ................ 315/307

FOREIGN PATENT DOCUMENTS

| JP | 61-154486 | 7/1986 |
| JP | 9-129382 | 5/1997 |
| JP | 2002-231474 A | 8/2002 |
| JP | 3096242 | 9/2003 |
| JP | 2004-213994 A | 7/2004 |

\* cited by examiner

*Primary Examiner*—Tuyet Vo
(74) *Attorney, Agent, or Firm*—Stephen Chin

(57) ABSTRACT

A cold-cathode tube drive device includes an inverter circuit (1) for generating a high-frequency voltage, a booster transformer (2) for boosting the high-frequency voltage generated by the inverter circuit (1), a cold-cathode tube (3) which is turned on by the high-frequency voltage after boosted by the booster transformer (2), a series circuit (6) having a reactance element (4) connected in parallel to the cold-cathode tube (3), a synthesis circuit (8) for combining the connected current value i2 of the series circuit (6) with the secondary side current value i1 of the booster transformer (2) so as to indirectly detect the lamp current value iL of the cold-cathode tube (3), and a control circuit (9) for controlling the inverter circuit (1) according to the lamp current value iL indirectly detected by the synthesis circuit (8) and controlling the lamp current of the cold-cathode tube (3).

4 Claims, 7 Drawing Sheets

COLD CATHODE TUBE DRIVE DEVICE

CROSS REFERENCES TO RELATED APPLICATIONS

This application claims priority to international application number PCT/JP 2005/014497 filed on Aug. 8, 2005 which claims priority to Japanese patent a application number 2004-303123 on Oct. 18, 2004, the entire disclosures of which are hereby incorporated by reference.

TECHNICAL FIELD

The present invention relates to a cold-cathode tube drive device.

BACKGROUND ART

Conventionally, a plurality of cold-cathode tubes (CCFLs: Cold Cathode Fluorescent Lamps) are used for a backlight of a liquid crystal display panel in a liquid crystal television receiver (hereinafter referred to as the "liquid crystal TV"), a liquid crystal monitor, or the like (see, for example, Japanese Patent Application Laid-Open No. 2004-213994 (FIG. 1) (Patent document 1)).

FIG. 4 is a circuit diagram showing a conventional cold-cathode tube drive device. In the device shown in FIG. 4, an inverter circuit 101 generates a high-frequency voltage, a booster transformer 102 boosts the high-frequency voltage generated by the inverter circuit 101 to apply the high-frequency voltage after boosted to a cold-cathode tube 103. A resonant capacitor 104 is a capacitor composing, together with a secondary winding of the booster transformer 102, a resonant circuit.

The inverter circuit 101 acquires a drop voltage by a resistor 105 via a diode D and detects a conducting current value of the cold-cathode tube 103 based thereon to thereby control lamp current of the cold-cathode tube 103 in accordance with the value.

Based on the circuit configuration as described above, the lamp current of the cold-cathode tube 103 is detected directly from a lower voltage portion of the cold-cathode tube 103.

In a liquid crystal display panel of a medium-size or below, the cold-cathode tube 103 is relatively short, in which stray capacitance caused by two wirings 106a, 106b disposed to be connected to both the electrodes of the cold-cathode tube 103 has a smaller impact, so that one of the two wirings 106a, 106b connected to both the electrodes of the cold-cathode tube 103 is integrated into the other.

Meanwhile, in a liquid crystal display panel of a large size, namely a widescreen being developed recently, the cold-cathode tube 103 of a long size is used and thereby the two wirings 106a, 106b have a longer length. Therefore, when one of the two wirings 106a, 106b is integrated into the other, the stray capacitance increases to increase current leakage, in which luminance down and efficiency down in lamp wattage with respect to the output of the inverter circuit 101 are caused.

Therefore, when the long cold-cathode tube 103 is used, the one of the two wirings 106a, 106b connected to both the electrodes of the cold-cathode tube 103 is not integrated into the other, and, instead, the wiring 106b at the lower voltage side is directly connected to a case or the like in the vicinity of the root of the cold-cathode tube 103 as a ground. FIG. 6 is a circuit diagram showing a conventional cold-cathode tube drive device for a long cold-cathode tube. In addition, FIG. 7 is a circuit diagram showing a conventional cold-cathode tube drive device for a plurality of the long cold-cathode tubes.

In the above cases, the wiring 106b at the lower voltage side is directly connected to the ground in the vicinity of the cold-cathode tube 103, in which the lamp current value cannot be detected directly from the lower voltage side of the cold-cathode tube 103, so that the conducting current of the secondary winding of the booster transformer 102 is detected as a lamp current from the drop voltage by the resistor 111.

Patent document 1: Japanese Patent Application Laid-Open No. 2004-213994 (FIG. 1).

DISCLOSURE OF THE INVENTION

Problems to be Solved by the Invention

However, in the conventional cold-cathode tube drive device for the long cold-cathode tube, the conducting current value of the secondary winding of the transformer 102 is indirectly detected as a lamp current value, in which the current conducting a stray capacitance Cf between both the electrodes of the cold-cathode tube 103 and a stray capacitance between the cold-cathode tube 103 and a structure such as a panel are included in the current value to be detected, making it difficult to detect a precise lamp current value to control the current, light amount and so forth of the lamp precisely.

The present invention has been made in consideration of the above-described problem, and an object thereof is to obtain a cold-cathode tube drive device capable of controlling current, a light amount and the like of a lamp precisely by detecting a lamp current value of a cold-cathode tube indirectly and precisely.

Means for Solving the Problems

In order to bring a solution to the above-described problem, the present invention is as described below.

A cold-cathode tube drive device according to the present invention includes: an inverter circuit generating a high-frequency voltage; a booster transformer boosting the high-frequency voltage generated by the inverter circuit; a cold-cathode tube which is turned on by the high-frequency voltage after boosted by the booster transformer; a series circuit having a reactance element and connected in parallel to the cold-cathode tube; a synthesis circuit combining the conducting current value of the series circuit with the secondary-side current value of the booster transformer so as to indirectly detect the lamp current value of the cold-cathode tube; and a control circuit controlling the inverter circuit according to the lamp current value indirectly detected by the synthesis circuit and controlling the lamp current of the cold-cathode tube.

With this, the impact of the conducting current of the stray capacitance on the current value detected indirectly is reduced by the synthesis circuit, so that the lamp current value of the cold-cathode tube can be detected indirectly and precisely, allowing the lamp current, the lamp light amount of and the like to be controlled precisely.

Further, in addition to the above-described cold-cathode tube drive device, the cold-cathode tube drive device according to the present invention may be as follows. Specifically, the synthesis circuit combines the conducting current value of the series circuit with the secondary-side current value of the booster transformer at a ratio of offsetting the conducting current value of the stray capacitance existing in parallel to the cold-cathode tube.

With this, the conducting current component of the stray capacitance is removed from the detected current value, allowing the lamp current value of the cold-cathode tube to be detected indirectly and more precisely, so that the lamp current, the lamp light amount and the like can be controlled more precisely.

Further, in addition to any one of the above-described cold-cathode tube drive devices, the cold-cathode tube drive device according to the present invention may be as follows. Specifically, as a reactance element of the series circuit, a resonant capacitor forming, together with the secondary wiring of the booster transformer, the resonant circuit is used.

With this, since the resonant capacitor is used as a reactance element of the series circuit, when a series circuit connected in parallel to the cold-cathode tube and having the reactance element is provided, the number of the additionally-provided element can be reduced.

EFFECT OF THE INVENTION

According to the present invention, the cold-cathode tube drive device detecting the lamp current value of the cold-cathode tube indirectly and precisely to control the lamp current, the lamp light amount and the like precisely can be obtained.

Figure 1:
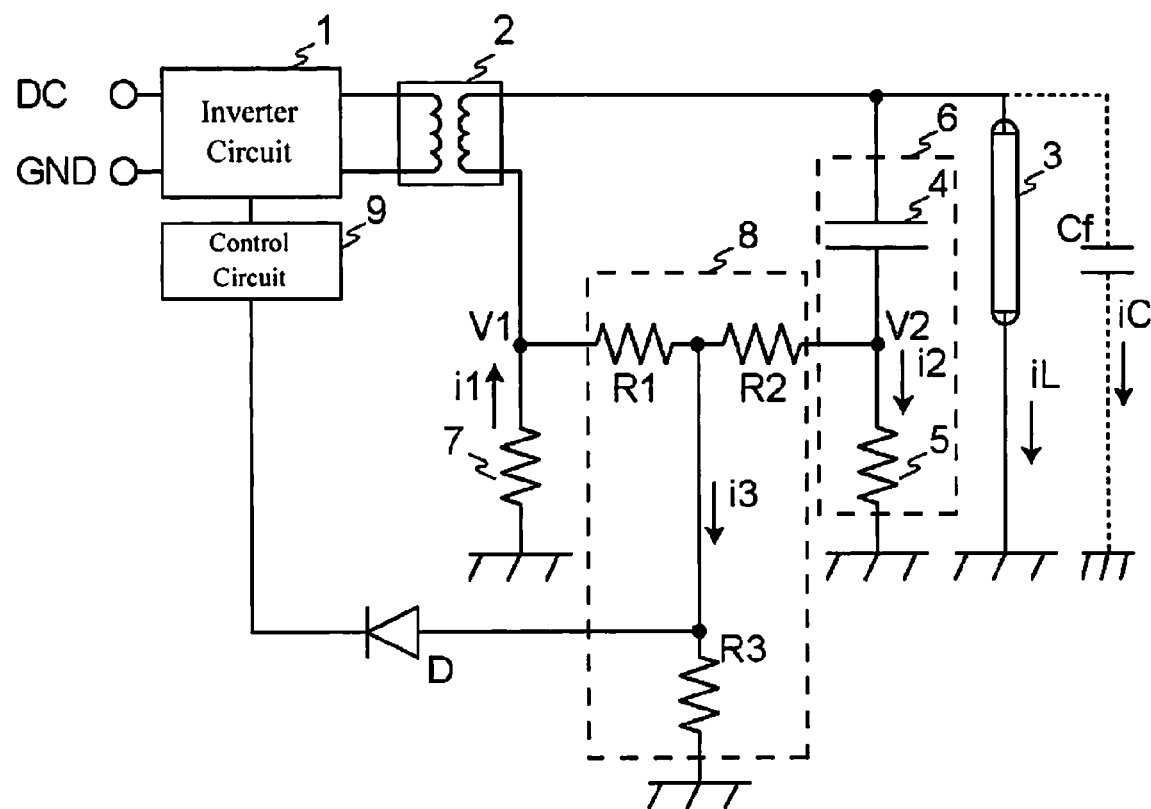
FIG. 1 is a circuit diagram showing a configuration of a cold-cathode tube drive device according to a mode of the present invention.

EXPLANATION OF NUMERALS AND SYMBOLS 1. inverter circuit
2. booster transformer
3. cold-cathode tube
4. resonant capacitor (reactance element)
6. series circuit
8. synthesis circuit
9. control circuit

BEST MODES FOR CARRYING OUT THE INVENTION

Hereinafter, modes according to the present invention will be described based on the drawings.

Mode 1.

FIG. 1 is a circuit diagram showing a configuration of a cold-cathode tube drive device according to a mode 1 of the present invention. In FIG. 1, an inverter circuit 1 is a circuit connected to a DC power source to generate a high-frequency voltage. A booster transformer 2 is a transformer boosting the high-frequency voltage generated by the inverter circuit 1.

A cold-cathode tube 3 is a cold-cathode tube (CCFL), of which one end is connected to one end of a secondary wiring of the booster transformer 2 and the other end is connected to a ground in the vicinity thereof (a ground line, a structure serving as a ground, or the like). The cold-cathode tube 3 is a discharge tube being a tube in which electrons traveling between electrodes clash with an enclosed gas and the like to emit fluorescence.

Further, a resonant capacitor 4 is a reactance element forming, together with the secondary winding of the booster transformer 2, a resonant circuit. A resistance 5 is a resistance element connected in series to the resonant capacitor 4. One end of the resonant capacitor 4 is connected to one end of the cold-cathode tube 3 and the other end of the resonant capacitor 4 is connected to one end of the resistance 5. The other end of the resistance 5 is connected to a ground. This resonant capacitor 4 and the resistance 5 compose a series circuit 6 connected in parallel to the cold-cathode tube 3.

Further, a resistance 7 is a resistance element connected in series to the secondary wiring of the booster transformer 2. One end of the resistance 7 is connected to the other end of the secondary wiring of the booster transformer 2 and the other end of the resistance 7 is connected to a ground.

Further, a synthesis circuit 8 is a circuit combining a conducting current value i2 of the series circuit 6 and a secondary-side current value i1 of the booster transformer 2 to indirectly detect a lamp current iL of the cold-cathode tube 3.

In the synthesis circuit 8, one end of a resistance R1 is connected to one end of the resistance 7 and the other end of the secondary wiring of the booster transformer 2, and the other end of the resistance R1 is connected to one end of a resistance R2 and one end of a resistance R3. The other end of the resistance R2 is connected to the other end of the resonant capacitor 4 and one end of a resistance 5. The other end of the resistance 3 is connected to a ground. In other words, the one end of the resistance R1 and the other end of the resistance R2 perform as two input ends of the synthesis circuit 8, and the node of the other end of the resistance R1 and the one end of the resistance R2 performs an output end of the synthesis circuit 8.

Further, a control circuit 9 is a circuit controlling the inverter circuit 1 according to the lamp current value indirectly detected by the synthesis circuit 8 to control the lamp current, the lamp wattage, and so on of the cold-cathode tube 3. Since the lamp current varies backed by an individual difference between each cold-cathode tube 3, an ambient temperature, and the like, the control circuit 9 controls the inverter circuit 1 so that the lamp current does not vary by the above-described factors and becomes constant. For instance, the control circuit 9 is a circuit supplying a switching element of a not-shown full-bridge configuration in the inverter circuit 1 with a gate signal to perform PWM (Pulse Width Modulation) control. In the resent mode, the control circuit 9 is connected to the node of the resistances R1, R2, R3 in the synthesis circuit 8 via a diode D.

Further, stray capacitance Cf is generated between both the electrodes of the cold-cathode tube 3 caused by the cold-cathode tube 3 itself, a small clearance between the cold-cathode tube 3 and the structure such as the panel, and so forth. The value of this stray capacitance Cf depends mainly on the size of the clearance between the cold-cathode tube 3 and the structure such as a panel chassis to be the ground.

Subsequently, the description will be given of the operation of the above-described device.

The inverter circuit 1 generates a high-frequency voltage of a predetermined frequency and applies it to a primary winding of the booster transformer 2. The booster transformer 2 boosts the high-frequency voltage generated by the inverter circuit 1. The voltage induced in the secondary winding of the booster transformer 2 is applied to the cold-cathode tube 3 and the like. With this, the lamp current iL is conducted to cause the cold-cathode tube 3 to emit light.

The control circuit 9 controls the inverter circuit 1 according to the value of the lamp current iL indirectly detected by the synthesis circuit 8 to control the lamp current iL, the lamp wattage, and so on.

Here, the detection of the lamp current value iL by the synthesis circuit 8 will be described.

Immediately after the light emission, a combined current, in which the lamp current, the conducting current of the stray capacitance Cf, and the like are combined, flows in the resistance 7 and the secondary side of the booster transformer 2, and the current value becomes i1.

Figure 2:
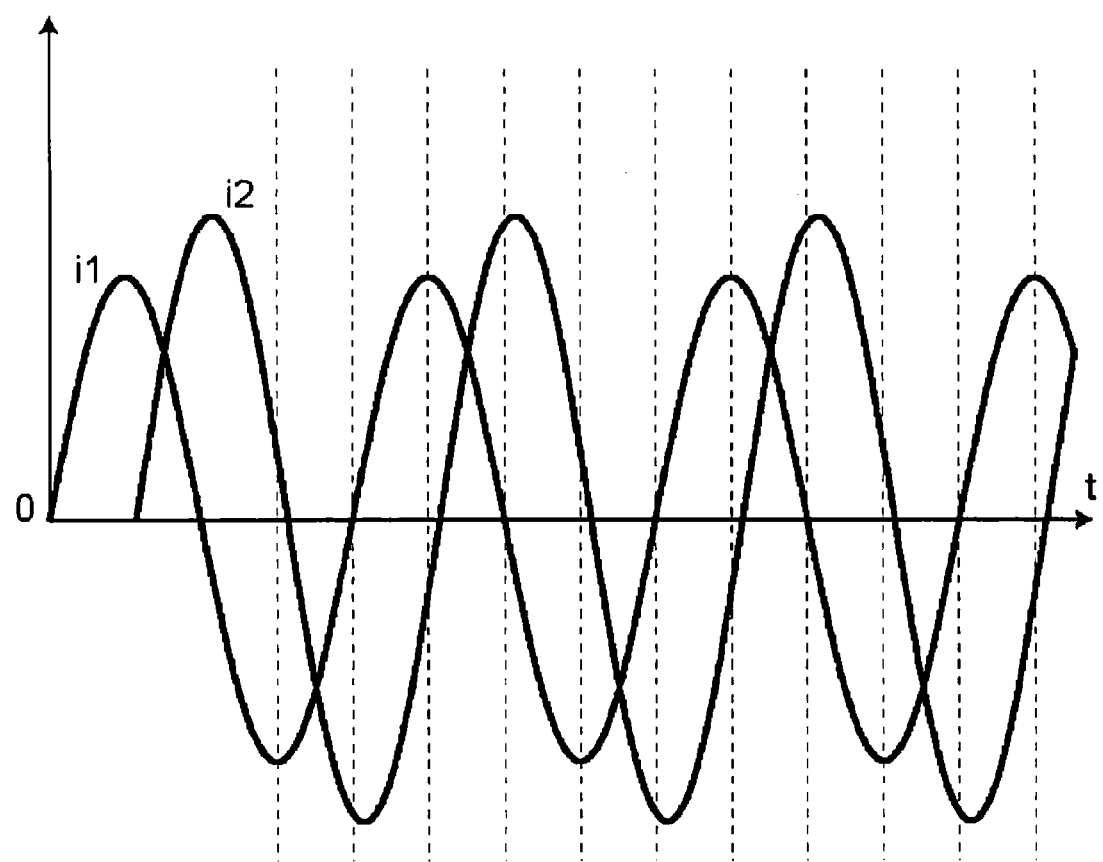
FIG. 2 is a view illustrating a relation between a secondary-side current value of a booster transformer and a conducting current value of a series circuit in the cold-cathode tube drive device according to the mode of the present invention.

In addition, the resonant capacitor 4 exists in the series circuit 6, in which the phase of the conducting current of the series circuit 6 deviates from the phase of the conducting current of the resistance 7, namely the phase of the secondary side current of the booster transformer 2. The amount of the phase deviation is approximately (90+45) degrees. FIG. 2 is a view illustrating a relation between the secondary-side current value i1 of the booster transformer 2 and the conducting current value i2 of the series circuit 6 in the cold-cathode tube drive device according to the mode of the present invention. As shown in FIG. 2, the phase of the current value i2 deviates from the phase of the current value i1.

In the synthesis circuit 8, in accordance with a voltage v1 (=−R7×i1, R7 is defined as the resistance value of the resistance 7) at both the ends of the resistance 7 and a voltage v2 (=R5×i2, R5 is defined as the resistance value of the resistance 5) at both the ends of the resistance 5, a combined current value i3 becomes approximately (−i1×R7/(R1+R3)+i2×R5/(R2+R3)). Specifically, the weighted difference between the conducting current value i1 of the resistance 7 and the conducting current value i2 of the resistance 5 is the combined current value i3.

Further, the combined ratio of the conducting current value i1 of the resistance 7 and the conducting current value i2 of the resistance 5 is adjustable at the ratio of the resistance values R5, R7 of the resistances 5, 7. Accordingly, the values of the resistances R5, R7 may be adjusted at the time of a trial manufacturing or a manufacturing of a liquid panel so that the lamp current iL and the combined current i3 coincide to be agreed or resemble, as an example. Further, for the purpose of easing the adjustment, it is acceptable that the resistances R5, R7 are variable resistances. Or otherwise, in place of the values of the resistances R5, R7 or in addition to the values of the resistances R5, R7, the values of the resistances R1, R2, R3 may be adjusted.

Meanwhile, the current value i1 of the resistance 7 contains the component of conducting current iC of the stray capacitance Cf, as described above, hence, the phase of the current value i1 of the resistance 7 deviates from the phase of the lamp current iL to the extent thereof. Therefore, in the synthesis circuit 8, by obtaining the difference between the current value i1 and the current value i2 of which phase deviates from the phase of the current value i1 in the manner as described above, a part or all of the component of the conducting current iC of the stray capacitance Cf in the current value i1 of the resistance 7 is/are offset, so that the current value close to the lamp current value iL can be obtained from the current value i1 of the resistance 7, as a combined current value i3.

Thus, the combined current value i3 can be obtained in the synthesis circuit 8, and this current value is detected as a voltage of both the electrodes of the resistance R3.

The control circuit 9 detects the voltage of both the electrodes of the resistance R3 via the diode D, and the combined current value i3 based thereon is defined as the lamp current value iL indirectly detected, to control the inverter circuit 1 based on the lamp current value iL.

Figure 3:
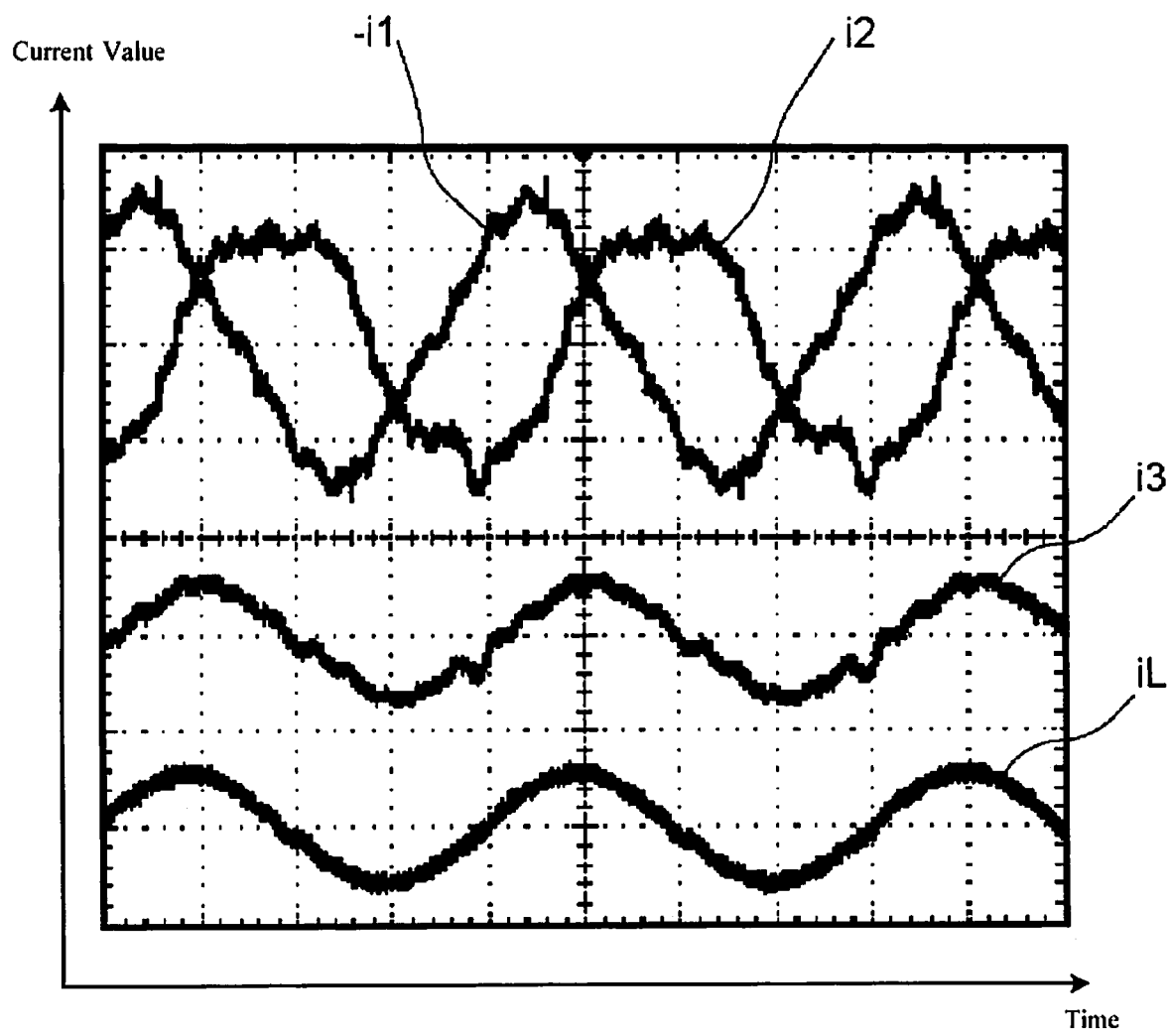
FIG. 3 is view to illustrate an effect of the cold-cathode tube drive device according to the mode of the present invention.
Figure 4:
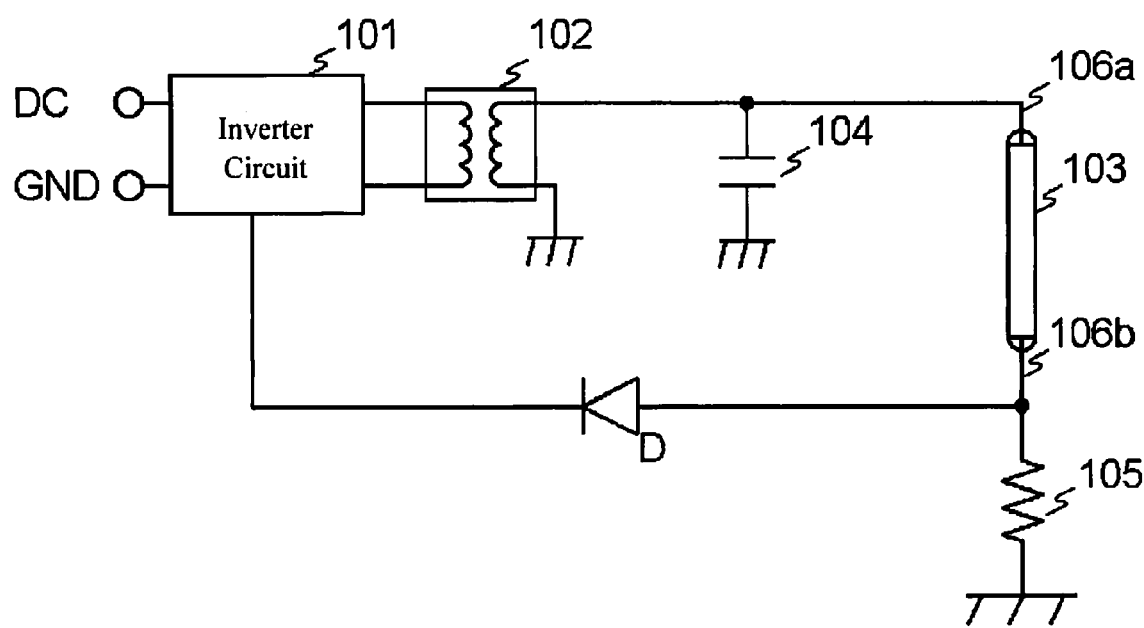
FIG. 4 is a circuit diagram showing a conventional cold-cathode tube drive device.

FIG. 3 is view to illustrate an effect of the cold-cathode tube drive device according to the mode of the present invention. In FIG. 3, in order to verify the effect of the cold-cathode tube drive device, a comparison is made between a actually measured waveform of the lamp current value iL being measured directly by inserting a resistance on the lower voltage side of the cold-cathode tube 3 of the circuit shown in FIG. 1 and a actually measured waveform of the combined current i3 in the synthesis circuit 8. As shown in FIG. 3, by combining the secondary-side current value i1 of the booster transformer 2 and the current value i2 of the series circuit 6 at the predetermined ratio, the combined current i3 almost coinciding as well as resembling the directly measured lamp current value iL can be obtained.

As has been described above, according to the mode 1 above, the series circuit 6 having the capacitor 4 is connected in parallel to the cold-cathode tube 3, and the synthesis circuit 8 combines the conducting current value i2 of the series circuit 6 and the secondary-side current value i1 of the booster transformer 2 to detect the lamp current value iL of the cold-cathode tube 3 indirectly. Based on the above, the control circuit 9 controls the inverter circuit 1 based on the value of the lamp current value iL indirectly detected by the synthesis circuit 8 to control the lamp current of the cold-cathode tube 3.

With this, the impact of the conducting current iC of the stray capacitance Cf on the current value iL indirectly detected is reduced by the synthesis circuit 8, hence, by detecting the lamp current value iL of the cold-cathode tube 3 indirectly and precisely, the lamp current, the lamp light amount, and the like can be controlled precisely. Further, when the plurality of cold-cathode tubes 3 are used as a backlight, the light amounts of the respective cold-cathode tubes 3 can be controlled precisely, so that luminance unevenness of the liquid display panel can be prevented from arising.

Furthermore, according to the mode 1 described above, the synthesis circuit 8 combines the secondary-side current value i1 of the booster transformer 2 with the conducting current value i2 of the series circuit 6 at the ratio of offsetting the conducting current value iC of the stray capacitance Cf existing in parallel to the cold-cathode tube 3.

Through this, the current value i3 in which the conducting current component iC of the stray capacitance Cf is removed is obtained, allowing the lamp current value iL of the cold-cathode tube 3 to be detected indirectly and more precisely, so that the lamp current, the lamp light amount and the like can be controlled more precisely.

Further, according to the mode 1 described above, as a reactance element of the series circuit 6, the resonant capacitor 4 forming, together with the secondary wiring of the booster transformer 2, the resonant circuit is used.

With this, since the resonant capacitor 4 is used as a reactance element of the series circuit 6, when the series circuit 6 connected in parallel to the cold-cathode tube 3 and having the reactance element is provided, the number of the additionally-provided element can be reduced.

Mode 2

Figure 5:
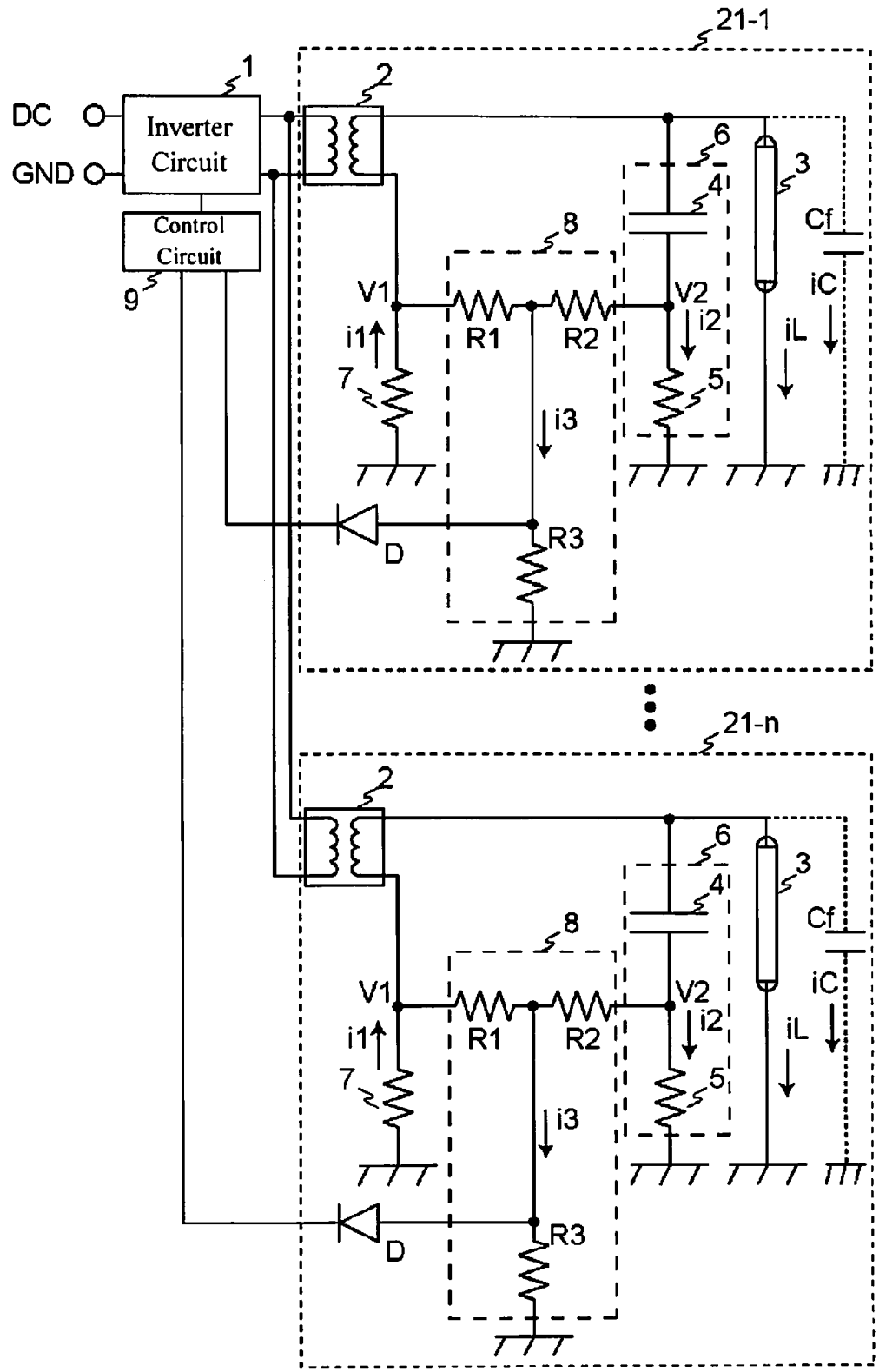
FIG. 5 is a circuit diagram showing a configuration of a cold-cathode tube drive device according to a mode 2 of the present invention.
Figure 6:
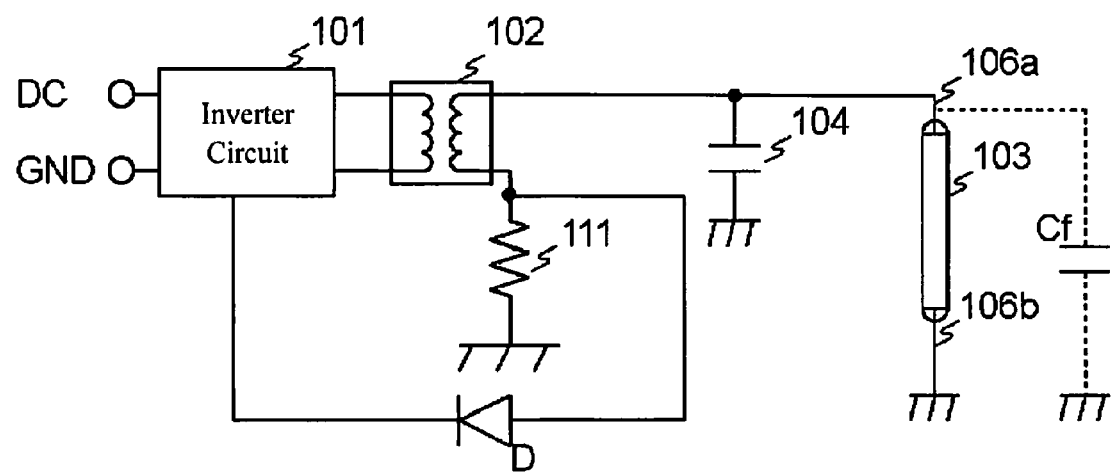
FIG. 6 is a circuit diagram showing a conventional cold-cathode tube drive device for a long cold-cathode tube.
Figure 7:
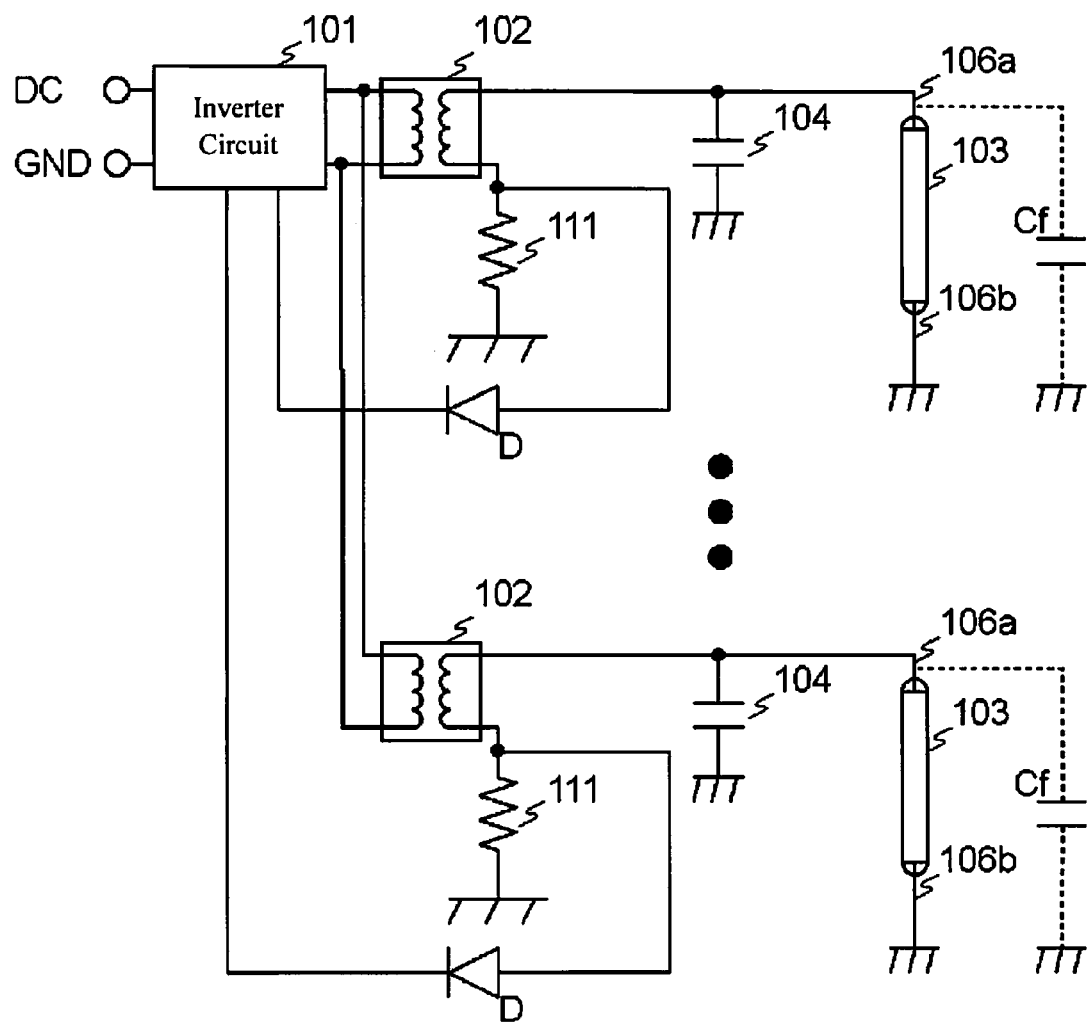
FIG. 7 is a circuit diagram showing a conventional cold-cathode tube drive device for a plurality of the long cold-cathode tubes.

A cold-cathode tube drive device according to a mode 2 of the present invention is a device driving a plurality of cold-cathode tubes. FIG. 5 is a circuit diagram showing a configuration of the cold-cathode tube drive device according to the mode 2 of the present invention. In FIG. 5, each of driving sections 21-$i$ ($i=1, \ldots, n, n>1$) are a circuit driving a single cold-cathode tube 3 based on the high-frequency voltage outputted by the inverter circuit 1. The respective driving sections 21-$i$ include the same booster transformer 2, cold-cathode tube 3, series circuit 6, resistance 7, synthesis circuit 8 and diode D as in FIG. 1, respectively. In the mode 2, the control circuit 9 controls the inverter circuit 1 based on the lamp current values indirectly detected by the synthesis circuits 8 in the driving sections 21-1 to 21-$n$ to thereby control the lamp currents, the lamp wattages, and the like of the cold-cathode tubes 3 in the driving sections 21-1 to 21-$n$.

Note that, as for the other configuration in FIG. 5, those denoted by the same numerical references as in the mode 1 (FIG. 1) have the same configurations as of the mode 1, respectively, so that the description thereof will be omitted here. Also, the operations of the respective driving sections 21-$i$ are the same as of the same circuit portion of the mode 1, so that the description thereof will be omitted here.

As has been described above, according to the above-described mode 2, even when the plurality of cold-cathode tubes 3 are turned on, the same effect as in the mode 1 can be obtained. In other words, when the plurality of the cold-cathode tubes 3 are used as a backlight, the light amounts of the respective cold-cathode tubes 3 can be controlled precisely, so that the luminance unevenness of the liquid display panel can be prevented from arising.

Note that the above-described respective modes are preferred examples of the present invention, however, the present invention is not limited to the above and can be modified or altered in various manner without departing from the scope of the present invention.

For instance, in the above-described first and mode 2, the resonant capacitor 4 is used as a reactance element of the series circuit 6, however, instead, the series circuit 6 may be provided independently of the resonant capacitor 4.

Further, in the above-described first and mode 2, the current value i1 (voltage value v1) and the current value i2 (voltage value v2) are combined by the synthesis circuit 8 composed of the three resistances R1, R2, R3, however, instead, the current value i1 (voltage value v1) and the current value i2 (voltage value v2) may be combined using an active element such as a transistor or an operational amplifier.

INDUSTRIAL AVAILABILITY

The present invention is applicable to, for example, the cold-cathode tube drive device to drive each of the plurality of long cold-cathode tubes composing the backlight of the liquid crystal display panel of a size of 20 inches or more.

The invention claimed is:

1. A cold-cathode tube drive device comprising:
an inverter circuit generating a high-frequency voltage;
a booster transformer boosting the high-frequency voltage generated by said inverter circuit;
a cold-cathode tube which is turned on by the high-frequency voltage after boosted by said booster transformer;
a series circuit having a reactance element and connected in parallel to said cold-cathode tube;
a synthesis circuit combining the conducting current value of the series circuit with the secondary-side current value of said booster transformer so as to indirectly detect the lamp current value of said cold-cathode tube; and
a control circuit controlling said inverter circuit according to the lamp current value indirectly detected by said synthesis circuit and controlling the lamp current of said cold-cathode tube.

2. The cold-cathode tube drive device according to claim 1, wherein said synthesis circuit combines the conducting current value of said series circuit with the secondary-side current value of said booster transformer at a ratio of offsetting the conducting current value of the stray capacitance existing in parallel to said cold-cathode tube.

3. The cold-cathode tube drive device according to claim 1, wherein the reactance element of said series circuit is a resonant condenser forming, together with the secondary wiring of said booster transformer, the resonant circuit.

4. The cold-cathode tube drive device according to claim 2, wherein the reactance element of said series circuit is a resonant condenser forming, together with the secondary wiring of said booster transformer, the resonant circuit.

* * * * *